United States Patent
Lazaridis et al.

(10) Patent No.: US 7,911,987 B2
(45) Date of Patent: Mar. 22, 2011

(54) METHOD FOR CREATING A PEER-TO-PEER IMMEDIATE MESSAGING SOLUTION WITHOUT USING AN INSTANT MESSAGING SERVER

(75) Inventors: Mihal Lazaridis, Waterloo (CA);
Gerhard D. Klassen, Waterloo (CA);
Christopher R. Wormald, Kitchener (CA); Sherryl Lee Lorraine Scott, Toronto (CA)

(73) Assignee: Research In Motion Limited, Waterloo (CA)

( * ) Notice: Subject to any disclaimer, the term of this patent is extended or adjusted under 35 U.S.C. 154(b) by 736 days.

(21) Appl. No.: 11/768,047

(22) Filed: Jun. 25, 2007

(65) Prior Publication Data

US 2007/0249377 A1  Oct. 25, 2007

Related U.S. Application Data (63) Continuation of application No. 10/942,167, filed on Sep. 16, 2004, now Pat. No. 7,236,472.

(60) Provisional application No. 60/503,367, filed on Sep. 16, 2003, provisional application No. 60/503,366, filed on Sep. 16, 2003.

(51) Int. Cl.
*H04B 7/00* (2006.01)
*H04W 4/00* (2009.01)

(52) U.S. Cl. ...... 370/310; 370/328; 455/466; 455/412.2

(58) Field of Classification Search ........................ None
See application file for complete search history.

(56) References Cited

U.S. PATENT DOCUMENTS

| 6,564,261 | B1 | 5/2003 | Gudjonsson et al. |
| 7,236,472 | B2 * | 6/2007 | Lazaridis et al. ............. 370/328 |
| 2003/0013467 | A1 | 1/2003 | Caloud |
| 2003/0018726 | A1 | 1/2003 | Low et al. |
| 2006/0101266 | A1 | 5/2006 | Klassen et al. |

FOREIGN PATENT DOCUMENTS

| EP | 1009153 A1 | 5/2000 |
| EP | 1233570 A | 8/2002 |
| EP | 1385323 A1 | 1/2004 |
| WO | WO 02065250 A2 | 8/2002 |
| WO | WO 03058908 | 7/2003 |

* cited by examiner

*Primary Examiner* — Erika A Gary
(74) *Attorney, Agent, or Firm* — Brett J. Slaney; Blake, Cassels & Graydon LLP

(57) ABSTRACT

A messaging method in a system including a wireless network, a routing server, and a plurality of mobile stations. A first mobile station has first communications applications and a first PIN and a second mobile station has second communications applications and a second PIN. The method includes sending an invitation including the first PIN from the first mobile station to the second mobile station using one of the first communications applications, and sending an acceptance including the second PIN from the second mobile station to the first mobile station using one of the second communications applications. The method further includes creating first messages including the second PIN and sending them to the second mobile station through the wireless network, and creating second messages including the first PIN and sending them to the first mobile station through the wireless network. The routing server routes the messages based on the PINs.

42 Claims, 2 Drawing Sheets

|  | Messaging Status | 7:00 PM | | 40 |
|---|---|---|---|---|
| 45 — | Current Conversations | Status | Last | |
| 60 — ✓ | Michael Adams | Available | S: 8/9/04, 6:50P | |
| ☏ | Mary Jones | On the Phone | S: 8/15/04, 11:20A | |
| 👤 | John Smith | In a Meeting | R: 8/12/04, 5:42P | |
| 50 — | Blocked corespondents | | | |
|  | Dad | | | |
|  | Mr. Jones | | | |
| 55 — | Pending Conversations | Status | | |
| 60 — 🚫 | Fred Johnson | Unavailable | | |
| 📠 | Mrs. Zimmer | Currently Messaging | | |

*FIG.3*

METHOD FOR CREATING A PEER-TO-PEER IMMEDIATE MESSAGING SOLUTION WITHOUT USING AN INSTANT MESSAGING SERVER

CROSS-REFERENCE TO RELATED APPLICATIONS

This application is a continuation of U.S. application Ser. No. 10/942,167 entitled "A Method for Creating a Peer-to-Peer Immediate Messaging Solution Without Using an Instant Messaging Server," which was filed on Sep. 16, 2004 and is now U.S. Pat. No. 7,236,472, which application claimed the benefit of U.S. Provisional Application No. 60/503,367 entitled "A Method for Creating a Peer-to-Peer Quick Messaging Solution Without Using an Instant Messaging Server," which was filed on Sep. 16, 2003, and U.S. Provisional Application No. 60/503,366 entitled "Activity Proxying Presence in Mobile Instant Messaging," which was filed on Sep. 16, 2003.

BACKGROUND OF THE INVENTION

1. Field of the Invention

The invention relates generally to a messaging solution for mobile stations such as cell phones, smart phones, personal data assistants (PDAs), pagers, handheld computers, phone-enabled laptop computers, and other mobile electronic devices, and more particularly, to a peer-to-peer immediate messaging solution for mobile stations that does not utilize an instant messaging server or the like that tracks state information, such as presence and "buddy list" information, for each mobile station.

2. Description of the Related Art

Instant messaging (IM) is a service that alerts users when another individual, such as a friend or colleague, is online and allows them to send messages to each other in real time, without the store-and-forward delays inherent in an electronic mail solution. With instant messaging, each user creates a list of other users with whom he or she wishes to communicate (commonly referred to as "buddy lists"). An instant messaging server keeps track of the online status of each of its subscribed users (often referred to as presence information), and when someone from a user's buddy list is online, the service alerts that user and enables immediate contact with the other user.

IM solutions are multiplying quickly and are showing up not only in land-line environments but also in wireless environments used by mobile stations such as cell phones, smart phones, personal data assistants (PDAs), pagers, phone-enabled laptop computers, and other mobile electronic devices. Wireless environments offer the potential for strong IM solutions, based on the time a user carries their mobile station with them. The number of available mobile stations that can run IM solutions is in the hundreds of millions.

It is well known in the art to port IM clients to a mobile station in order to gain access to one of the many IM services available. These services include AOL's Instant Messenger (AIM), ICQ, Yahoo! and Microsoft's MSN Messenger products. These products are known to have tens of millions of users supported by each IM server, and these communities are sometimes inter-connected to produce even larger communities. However, land-line and desktop-based IM solutions fall short of what a user that is often mobile wants and needs, namely good IM functionality wherever they may be with their mobile station. Additionally, the small screens and memories of mobile stations often result in a frustrating experience for people on the road trying to use IM. These people are forced to accept the poor performance and experience of existing IM solutions because they want or need to reach land-line users operating legacy desktop IM solutions and have no other alternatives to select from. There is thus a need for a better and more complete messaging solution (that enables immediate messaging like IM) that is designed for wireless mobile electronic devices that can take advantage of the "always on" nature of a mobile station.

Another major problem with existing IM applications in a wireless environment is that existing IM applications require the frequent exchange of messages between the client and server to indicate when a user is available. These frequent messages, which increase network traffic, are problematic for wireless networks because the bandwidth of a wireless network is very limited and the cost of data exchange is very high. This problem is further compounded by the reduction of mobile station battery life by transmitting lots and lots of small messages around to keep track of presence information, buddy lists and buddy status. These small messages are compounded by the fact that "presence update" information is being exchanged between correspondents constantly.

Yet another major problem with existing IM applications is the lack of security in the systems for corporate users. Although it is true that the exchange between users could be encrypted, this does not solve the problem of my instant messaging identity being passed around between users. Also, the problem of authenticating who is inviting me to IM with them has not been solved.

Another common wireless messaging standard is short message service (SMS), used throughout North America and especially in European China and India. This service also has many flaws. First, the addressing of each SMS user must be performed through their MS-ISDN, or telephone number. This phone number is extremely easy to pass around and it is impossible to verify the authenticity of the sender. Second, there is no implied presence, or any actual delivery information, so the exchange of information has a lot of risk associated with it. SMS also has no concept of a conversation that lasts forever, and in fact there are no SMS devices that keep long-term status information regarding an SMS conversation with another party.

SUMMARY OF THE INVENTION

A system and method provide for immediate peer-to-peer messaging between mobile stations that overcomes many of the problems associated with known prior art IM solutions. Because the system and method do not require a server that tracks state information such as presence and buddy list information, the volume of data exchange is reduced. In addition, the system and method provide increased security because the underlying address identity of each user of a mobile station in the system is kept secret and because invitations to engage in peer-to-peer messaging cannot be passed around to other users. Furthermore, availability information is exchanged between users and enhances the user experience by providing information as to whether another user is likely to respond to a particular message.

These and other aspects of the invention are provided by a system including a wireless network, a routing server coupled to the wireless network, and a plurality of mobile stations, and a method of exchanging messages between a first mobile station and a second mobile station in such a system. The first mobile station is provided with one or more first communications applications and a first personal identification number and the second mobile station is provided with one or more second communications applications and a second personal identification number. The first and second communications applications may include one or more existing communications applications, such as a wireless telephone application, an email application, a short message service (SMS) application, a multimedia messaging service (MMS) application, and an enhanced message service (EMS) application. The first and second mobile stations are also provided with a peer-to-peer messaging application that implements the invention.

The method includes sending an invitation message that includes the first personal identification number from the first mobile station to the second mobile station using one of the first communications applications, and sending an acceptance message that includes the second personal identification number from the second mobile station to the first mobile station using one of the second communications applications. After these steps, the method further includes creating one or more first messages that each includes the second personal identification number and sending the first messages to the second mobile station through the wireless network using the routing server. The routing server routes the first messages based on the second personal identification number. The method also includes creating one or more second messages that each includes the first personal identification number and sending the second messages to the first mobile station through the wireless network using the routing server. The routing server routes the second messages based on the first personal identification number. The routing server does not track any state information for any of the mobile stations, such a presence information or buddy list information.

The method may further include sending a second invitation message including the first personal identification number from the first mobile station to the second mobile station using another one the first communications applications. In this case, the second mobile station may be permitted to accept the invitation message only if both invitation messages are received by the second mobile station.

In one particular embodiment, a phone call may be placed from the first mobile station to the second mobile station over a voice circuit. In this case, the invitation message comprises a plurality of first DTMF tones sent from the first mobile station to the second mobile station over the voice circuit, and the acceptance message comprises a plurality of second DTMF tones sent from the second mobile station to the first mobile station over the voice circuit.

The first mobile station may, according to an aspect of the invention, periodically send a first availability information message to the second mobile station through the routing server and the second mobile station may periodically send a second availability information message to the first mobile station through the routing server. The availability information messages may be derived from a current operational state of the mobile station in question, and may relate to a specific state of or an event occurring on the mobile station in question. In addition, each mobile station may periodically send such availability information messages to all of the mobile stations in its contact database.

BRIEF DESCRIPTION OF THE DRAWINGS

A full understanding of the invention can be gained from the following Description of the Preferred Embodiment when read in conjunction with the accompanying drawings in which.

Similar numerals refer to similar parts throughout the specification.

DESCRIPTION OF THE PREFERRED EMBODIMENT

Figure 1:
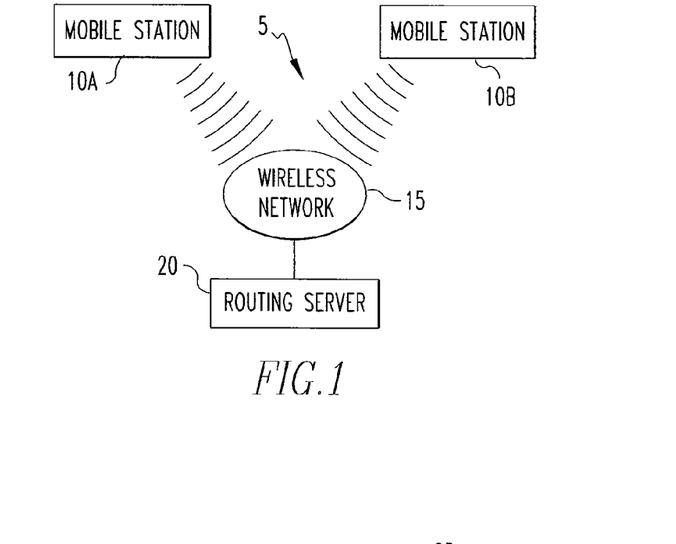
FIG. 1 is a block diagram of a system enabling immediate peer-to-peer messaging between mobile stations according to the invention.

FIG. 1 is a block diagram of a system 5 for enabling immediate peer-to-peer messaging according to the invention. System 5 includes a plurality of mobiles stations 10, such as mobile stations 10A and 10B shown in FIG. 1, which may be any type of wireless mobile electronic communications device such as a cell phone, a smart phone, a personal data assistant (PDA), a pager, a handheld computer or a phone-enabled laptop computer, to name a few. As is known, each mobile station 10 may be provided with various applications, including, without limitation, one or more currently existing applications that enable communication with other mobile stations 10, such as a wireless telephone application, an email application, a short message service (SMS) application, a multimedia messaging service (MMS) application, an enhanced message service (EMS) application, and other Internet enable messaging applications (each of which may be referred to herein as an "existing communications application"). In addition, each mobile station 10 is provided with an application that implements the peer-to-peer messaging solution of the invention as described herein (referred to herein as the "peer-to-peer messaging application"). The term "application" as used herein shall include one or more programs, routines, subroutines, function calls or other type of software or firmware and the like, alone or in combination. System 5 also includes wireless network 15, which may be any wireless communications network or combination of interconnected networks, including, without limitation, Mobiltex™, DataTAC™, AMPS, TDMA, CDMA, GSM/GPRS, PCS, EDGE, UMTS or CDPD. As is known, wireless network 15 includes a plurality base stations that perform radio frequency (RF) protocols to support data and voice exchanges with mobile stations 10A and 10B. Routing server 20 is coupled to wireless network 15. Routing server 20 may be any type of routing equipment capable of quickly routing data packets, including, without limitation, a TCP/IP router such as those sold by Cisco Systems, Inc. of San Jose, Calif., or a network address translation server (NAT).

Each mobile station 10 of system 5 is assigned and stores a unique personal identification number (PIN). The PIN for each mobile station 10 may be assigned and stored therein when it is manufactured or through its subscriber identity module (SIM). Each PIN is mapped to a network address for the corresponding mobile station 10 on wireless network 15 that enables data to be routed to the mobile station 10. Routing server 20 includes one or more routing tables for routing messages sent by mobile stations 10 based on this mapping. In one exemplary embodiment, the PIN may actually be the network address itself, and in another exemplary embodiment, the PIN may be the phone number of the mobile station 10 or a unique ID such as the mobile subscriber ISDN (MSISDN) for the mobile station 10, and the network address may be an IP address or the like.

For convenience in describing the establishment and maintenance of a peer-to-peer messaging session between two mobile stations 10 according to the invention, reference will be made to mobile station 10A and 10B shown in FIG. 1. It will be appreciated, however, that the same description will apply to a peer-to-peer messaging session between any two mobile stations 10. When a user of mobile station 10A wants to establish a peer-to-peer messaging session according to the invention with another mobile station 10, such as mobile station 10B, mobile station 10A creates and sends an invitation to mobile station 10B using one or more of the existing communications applications common to both mobile station 10A and mobile station 10B. Preferably, this is facilitated and accomplished through the peer-to-peer messaging application using appropriate menus and/or dialog boxes displayed to the user on a display of mobile station 10A. The invitation in each case consists of a message appropriate for the particular existing communications application, such as an email, SMS, EMS, or MMS message or a wireless telephone call, that includes: (1) some form of a request as to whether the user of mobile station 10B wants to accept the invitation and establish a peer-to-peer messaging session with mobile station 10A using mobile station 10B, (2) a file or portion thereof that includes the PIN of mobile station 10A, and (3) an indicator(s) that indicates that the message is for a peer-to-peer messaging session using the peer-to-peer messaging application. As described in greater detail hereinafter, item (3) is a data element that identifies the invitation message as being a special type of message and causes the peer-to-peer messaging application of mobile 10 to be activated upon receipt thereof. If the user of mobile station 10B desires to establish a peer-to-peer messaging session with mobile station 10A, the user of mobile station 10B will respond to the invitation with an acceptance message using the appropriate existing communications application that includes: (1) some form of confirmation to the user of mobile station 10A that the user of mobile station 10B desires to establish a session, (2) a file or portion thereof that includes the PIN of mobile station 10B, and (3) an indicator(s) that indicates that the message is for a peer-to-peer messaging session using the peer-to-peer messaging application. Again, this is preferably facilitated and accomplished through the peer-to-peer messaging application using appropriate menus and/or dialog boxes displayed to the user on a display of mobile station 10B. Preferably, whenever a PIN is sent from one mobile station to another, it is transmitted in a coded (such as with a hash function) and/or encrypted format, and each of the mobile stations 10 of system 5 is provided with information that is necessary to decode and/or decrypt such PINs when received.

As will be appreciated, once the above steps are complete, mobile station 10A will have the PIN for mobile station 10B, and mobile station 10B will have the PIN for mobile station 10A. Now, if either mobile station 10A or 10B desires to send a peer-to-peer message to the other, it prepares a peer-to-peer message using the peer-to-peer messaging application that includes the PIN of the recipient mobile station 10 (10A or 10B, as the case may be), preferably in the message header, along with the message information that is to be sent. The peer-to-peer message is then sent by the mobile station 10 through wireless network 15 to routing server 20. Routing server 20 obtains the PIN from the peer-to-peer message and uses it to determine the network address of the recipient mobile station 10 (10A or 10B, as the case may be) using the routing table(s) stored therein, and sends the message to the recipient mobile station 10 (10A or 10B, as the case may be) through wireless network 15 using the determined network address. Once received, the peer-to-peer message, and in particular the message information contained therein, may be displayed to the user of the recipient mobile station 10 (10A or 10B, as the case may be).

According to one embodiment of the invention, security may be increased in peer-to-peer messaging by sending invitations as described above over multiple communication paths using multiple existing communications applications. As will be appreciated, each communication path confirms a different address identity for the sender of the invitation, thus helping to confirm the authenticity of the invitation. For example, the user of mobile station 10A may wish to establish a peer-to-peer messaging session with the user of mobile station 10B by sending an invitation as described above using both an email application and an SMS application. In this case, when the invitation messages are received by mobile station 10B, the "inbox" or the like of mobile station 10B will show two messages from mobile station 10A, i.e., the email invitation and the SMS invitation. When the messages arrive, the user of mobile station 10B could be working in any application of mobile station 10B, such as the calendar application, the address book application, the browser application or the phone application, or not currently using mobile station 10B at all (although it is powered on). The user will be notified of the arrival of the invitation messages in the same manner as any other message received by mobile station 10B (e.g., by beeping and/or vibrating). When the user of mobile station 10B opens either of these two messages, the peer-to-peer messaging application will be invoked to process the message. As will be appreciated by those of skill in the art, the automatic invocation of the peer-to-peer messaging application may be accomplished by providing each invitation message, regardless of form, with special indicators to indicate that it is an invitation for a peer-to-peer messaging session and by programming the peer-to-peer application to monitor all incoming messages for such indicators. In addition, each invitation message, when created within the peer-to-peer messaging application, will include an indication of the number (over different paths) of invitation messages that were sent. In the case where multiple paths are used, as in this example, the peer-to-peer messaging application will next scan the "inbox" or the like for the other invitation message(s). For example, if the email invitation message is opened first, the peer-to-peer application will scan the "inbox" or the like for the SMS invitation message. As described above, the invitation messages may be identified by the special indicators provided therewith. The peer-to-peer messaging application in this embodiment will not provide the user of mobile station 10B with the ability to accept the invitation until the other invitation message(s) is found. Once the other invitation message(s) is found, the user of mobile station 10 may accept the invitation as described above, reject the invitation, or postpone the decision to accept or reject.

According to another particular embodiment of the invention, a peer-to-peer messaging conversation may be established using a telephone call such as a circuit switched cell phone call. In particular, again using mobile stations 10A and 10B as an example, mobile station 10A first initiates a phone call to mobile station 10B through wireless network 15 using the phone application of mobile station 10A, which call is answered by mobile station 10B using its phone application. Use of a phone call to initiate the session allows for voice authentication of each party to be performed, thereby increasing security. While the call is open between mobile station 10A and mobile station 10B, mobile station 10A, at the request of the user of mobile station 10A (such as through an appropriate menu selection and/or dialog box displayed on mobile station 10A), sends a peer-to-peer messaging invitation to mobile station 10B consisting of a series of Dual Tone Multi-Frequency (DTMF) tones through the voice circuit already connected between mobile station 10A and mobile station 10B. This invitation will, as described above, include the PIN of mobile station 10A. Upon receipt of the DTMF invitation message, the peer-to-peer messaging application of mobile station 10B will notify the user of mobile station 10B of the invitation and provide the user the option of accepting, rejecting, or postponing a decision on the invitation, such as through a dialog box or the like displayed to the user. If the user of mobile station 10B accepts, the peer-to-peer messaging application of mobile station 10B causes an acceptance response message to be sent to mobile station 10A consisting of a series of DTMF tones sent through the voice circuit already connected between mobile station 10A and mobile station 10B. These DTMF tones will include the PIN of mobile station 10B. At this point, mobile station 10A and mobile station 10B will have exchanged the information necessary to carry on a peer-to-peer messaging session, and the parties may begin to exchange such messages in the manner described above. As will be appreciated, alternatives to sending and receiving information over the voice channel include analog modem techniques and non-DTMF tones, and may be substituted for DTMF tones in this embodiment.

According to another aspect of the invention which increases security, the PIN of each mobile station 10 is kept secret. This allows each user of each mobile station 10 to control who has access to the user's "network identity," i.e., the PIN. Without such a safeguard, a user's network identity may be shared broadly and without their control. This can be accomplished in a number of ways. A simple method is just to encode the PIN as a binary attachment to a message such as an email. In this way, the information is made available to the software of a mobile station 10, but is not readily available to the user. If the attachment also contains a binary specification of the intended recipient (e.g. their email address), then the software may only allow the user to accept the invitation if their email address matches that of the intended recipient. Note that, with this mechanism, the user may be able to view the PIN if they are able to view the binary attachment data. The system can be made more secure in a number of ways. For example, the PIN may be encrypted using a key known by both the sender and recipient, or obfuscated using an algorithm known by both the sender and recipient.

Figure 2:
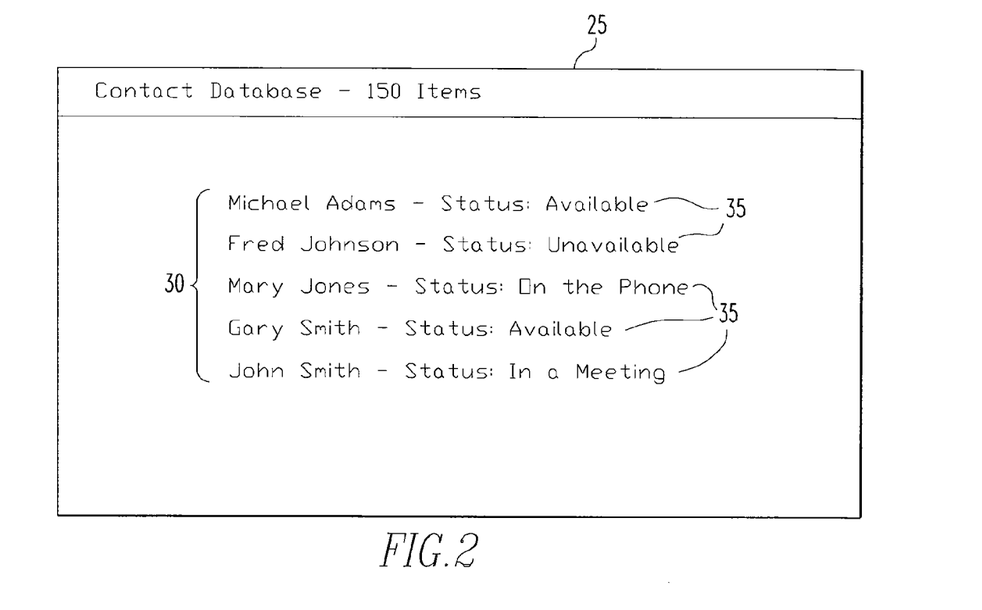
FIG. 2 is a view of a portion of a display of a mobile station showing an exemplary contact database screen which is part of a peer-to-peer messaging application according to the invention.

According to an aspect of the invention, the peer-to-peer messaging application of each mobile station 10 includes a contact database that stores the name and/or other identifying information and corresponding PIN for each user of another mobile station 10 with whom the user of the mobile station 10 has communicated or may wish to communicate using the peer-to-peer messaging application. This contact database is thus similar to the "buddy lists" that are part of IM applications. User and PIN information may be added to and stored in the contact database each time the user establishes a peer-to-peer messaging session with another user, or simply by a user entering the information obtained from another user in a different manner. Entries may also be selectively deleted from the contact database by a user. FIG. 2 is a view of a portion of a display of a mobile station 10 showing an exemplary contact database screen 25 which is part of the peer-to-peer messaging application and displays a listing 30 of contacts stored in the contact database. As seen in FIG. 2, contact database screen 25 also provides status information 35 for each contact listed in listing 30 that relates to the likely availability of the particular contact to participate in a peer-to-peer messaging session, referred to as "implied availability." This availability information is discussed in greater detail below.

According to a further aspect of the invention, each mobile station 10 (referred to as the "first mobile station 10" for clarity) periodically transmits, such as every ten minutes to minimize data traffic, availability information pertaining to it to the mobile stations 10 of each of the users listed in the contact database of the first mobile station 10 (referred to as the "other mobile stations 10" for clarity) through wireless network 15 and routing server 20 using the stored PIN of each of those users. In one particular embodiment, if any of the other mobile stations 10 is off or out of coverage range, routing server 20 will queue a number of availability information messages intended for such other mobile stations 10, and will deliver them once the other mobile stations 10 are turned on or are back in coverage range. The availability information, which will change over time, is derived from the current operational state of the first mobile station 10. The availability information is intended to provide an indication of the user's activity in the first mobile station 10 in order to give each of the users of the other mobile stations 10 in the contact database an estimate of how likely it is that the user of the first mobile station 10 will read and reply to a peer-to-peer message sent to the user of the first mobile station 10. Thus, because all of the mobile stations 10 in system 5 (unless disabled as described below) transmit their availability information to all of their contacts, it will be appreciated that each mobile station 10 in system 5 will have availability information for each of the other users in its contact database. As a result, a user of any mobile station 10 will be able to consult the availability information of any of the contacts listed in contact database of the mobile station 10 to get an idea as to whether a particular contact is likely to receive and respond to a peer-to-peer message, which information may effect the decision as to whether to send a peer-to-peer message at all.

The availability information may consist of a general status indicator such as "available," indicating, for example, that the mobile station 10 is powered on and in range of the wireless network 15 and not actively utilizing an application that would prevent a peer-to-peer message from being received, such as being engaged in a phone call using the telephone application, or "unavailable," indicating, for example, that the mobile station 10 is powered off or out of range of the wireless network 15. In addition, the availability information may relate to specific states of or events occurring on the mobile station 10, such as ignoring incoming telephone calls, the user powering the mobile station 10 off, the first mobile station 10 being involved in a current telephone call, the user of the first mobile station 10 being in a meeting as indicated by an entry in the calendar application provided in the mobile station 10, or the user of the mobile station 10 is currently using the peer-to-peer messaging application. As will be appreciated, the availability information may be tied to and derived from every action of and/or piece of information available within the mobile station 10, and that the specific examples listed above are meant to be exemplary only and not limiting. In addition, the general status indicators may comprise a number of levels or degrees of availability based upon information relating to the specific states of and/or events occurring on the mobile station 10. In such a case, availability information may be reported on a scale indicating the various levels or degrees of availability, such as "Available-Level 1," "Available-Level 2," and so on. In addition, if a given user of a mobile station 10 does not want their availability to be tracked this closely, they may selectively prevent their mobile station 10 from transmitting availability information. A more detailed discussion of the generation and provision of availability information is provided in commonly owned U.S. application Ser. Nos. 10/942,749 and 10/942,305, entitled "Handheld Electronic Device and Associated Method Providing Availability Data in a Messaging Environment," the disclosures of which are hereby incorporated into the present application by reference.

Figure 3:
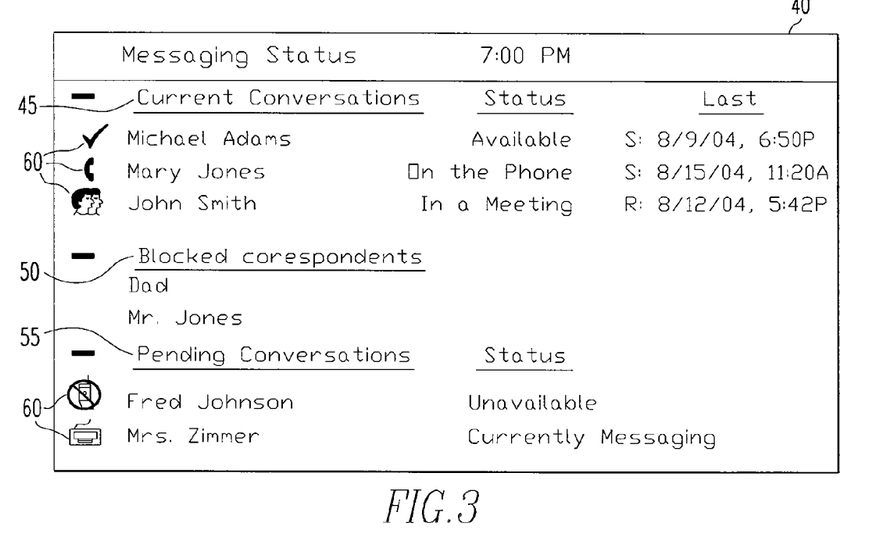
FIG. 3 is a view of a portion of a display of a mobile station showing an exemplary status screen forming a part of a peer-to-peer messaging application according to the invention.

FIG. 3 is a view of a portion of a display of a mobile station 10 showing an exemplary status screen 40 forming a part of the peer-to-peer messaging application according to the invention. Status screen 40 is the main screen of the peer-to-peer messaging application and provides the user of the mobile station 10 with overall status information relating to the peer-to-peer messaging application. In particular, status screen 40 provides information relating to various groups, including a current conversations group 45, a blocked correspondents group 50 and a pending conversations group 55. The current conversations group 45 lists and provides information relating to all of the peer-to-peer messaging sessions, also referred to as conversations, in which the mobile station 10 is currently engaged. A current conversation means either that the mobile station 10 has sent an invitation as described above to another mobile station 10 and has received an acceptance message as described above in return, or that another mobile station 10 has sent the mobile station 10 an invitation as described above and the mobile station 10 has responded with an acceptance message as described above. The blocked correspondents group 50 provides a listing of users of other mobile stations 10 from whom the user of this mobile station 10 no longer wishes to receive peer-to-peer messages; their messages will be blocked and not displayed to the user. Preferably, "unavailable" availability information is transmitted by the mobile station 10 to each of the blocked correspondents. Alternatively, peer-to-peer messages from users of other mobile stations 10 from whom the user of this mobile station 10 no longer wishes to receive peer-to-peer messages may be blocked and not displayed to the user by removing such other users from the contact database; in this case, the peer-to-peer messaging application will be adapted to block messages from any user not listed in the contact database. The pending conversations group 55 provides information relating to all of the currently pending conversations of the mobile station 10. A pending conversation means either that the mobile station 10 has sent an invitation as described above to another mobile station 10 and has not yet received a response, or that another mobile station 10 has sent the mobile station 10 an invitation as described above and the mobile station 10 has not yet responded.

The current conversations group 45, the blocked correspondents group 50 and the pending conversations group 55 may be selectively expanded, where additional information is displayed, or collapsed, where additional information is not displayed. Each of the current conversations group 45, the blocked correspondents group 50 and the pending conversations group 55 is shown in FIG. 3 in expanded from. A user may selectively toggle between the expanded and collapsed states by providing an input into the mobile station 10 through an input apparatus, such as a plurality of keys and/or a rotating thumbwheel, included as part of the mobile station 10. In the expanded state, the current conversations group 45 lists for each current conversation: (1) the user associated with the other mobile station 10, (2) availability information relating to the other mobile station 10, and (3) the date and/or time of the most recent message sent or received. Since a peer-to-peer messaging session can remain open and active for long periods of time, e.g., weeks or months, item (3) provides a quick reference as to which conversations are most active and current. In the expanded state, the pending conversations group 55 lists for each pending conversation: (1) the user associated with the other mobile station 10, and (2) availability information relating to the other mobile station 10. As seen in FIG. 3, an icon 60 indicative of the availability information is preferably provided next to each entry in the current conversations group 45 and the pending conversations group 55 for ease of reference for the user.

Thus, the invention provides a system and method for immediate peer-to-peer messaging between mobile stations that overcomes many of the problems associated with known prior art IM solutions. Because, unlike an IM server, routing server 20 does not track state information such as presence and buddy list information, the volume of data exchange is reduced. In addition, security is increased because the underlying address identity of each user is kept secret and because messaging invitations cannot be passed around to other users. Furthermore, availability information exchanged between users enhances the user experience by providing information as to whether another user is likely to respond to a particular message.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of exchanging messages between a first mobile station and a second mobile station in a system including a wireless network and a routing server coupled to said wireless network, said first mobile station having one or more first communications applications and said second mobile station having one or more second communications applications, said first mobile station having a first personal identification number and said second mobile station having a second personal identification number, the method comprising:

sending an invitation message from said first mobile station to said second mobile station using one of said one or more first communications applications, said invitation message including said first personal identification number;

sending an acceptance message from said second mobile station to said first mobile station using one of said one or more second communications applications, said acceptance message including said second personal identification number;

creating one or more first messages, said first messages including said second personal identification number;

sending said one or more first messages to said routing server through said wireless network;

sending said one or more first messages from said routing server to said second mobile station through said wireless network, said one or more first messages being routed by said routing server based on said second personal identification number;

creating one or more second messages, said second messages including said first personal identification number;

sending said one or more second messages to said routing server through said wireless network;

sending said one or more second messages from said routing server to said first mobile station through said wireless network, said one or more second messages being routed by said routing server based on said first personal identification number; and said first mobile station periodically sending an availability information message to said second mobile station.

2. The method according to claim 1, said availability information message including said second personal identification number.

3. The method according to claim 2, said sending said availability information message to said second mobile station comprising sending said availability information message to said routing server through said wireless network and sending said availability information message from said routing server to said second mobile station through said wireless network, said routing server routing said availability information message based on said second personal identification number.

4. The method according to claim 1, said availability information message being derived from a current operational state of said first mobile station.

5. The method according to claim 4, said availability information message relating to a specific state of or an event occurring on said first mobile station.

6. The method according to claim 1, said one of said first communications applications and said one of said second communications applications being of the same type.

7. A method of facilitating the exchange of messages between a first mobile station and a second mobile station in a system including a wireless network and a routing server coupled to said wireless network, said first mobile station having one or more first communications applications and said second mobile station having one or more second communications applications, said first mobile station having a first personal identification number and said second mobile station having a second personal identification number, wherein said first mobile station sends an invitation message to said second mobile station using one of said one or more first communications applications, said invitation message including said first personal identification number, and wherein said second mobile station sends an acceptance message to said first mobile station using one of said one or more second communications applications, said acceptance message including said second personal identification number, the method comprising:
  receiving one or more first messages in said routing server from said first mobile station through said wireless network, said one or more first messages including said second personal identification number;
  sending said one or more first messages from said routing server to said second mobile station through said wireless network, said one or more first messages being routed to said second mobile station based on said second personal identification number;
  receiving one or more second messages in said routing server from said second mobile station through said wireless network, said one or more second messages including said first personal identification number;
  sending said one or more second messages from said routing server to said first mobile station through said wireless network, said one or more second messages being routed to said first mobile station based on said first personal identification number; and
  periodically receiving an availability information message in said routing server from said first mobile station through said wireless network and sending said availability information message from said routing server to said second mobile station through said wireless network, said availability information message being routed to said second mobile station based on said second personal identification number.

8. The method according to claim 7, said availability information message including said second personal identification number.

9. A method of facilitating the exchange of messages between a first mobile station and a second mobile station in a system including a wireless network and a routing server coupled to said wireless network, said first mobile station having one or more first communications applications and said second mobile station having one or more second communications applications, said first mobile station having a first personal identification number and said second mobile station having a second personal identification number, wherein said first mobile station sends an invitation message to said second mobile station using one of said one or more first communications applications, said invitation message including said first personal identification number, and wherein said second mobile station sends an acceptance message to said first mobile station using one of said one or more second communications applications, said acceptance message including said second personal identification number, said first mobile station having a contact database having a plurality of contacts each having a corresponding contact mobile station, the method comprising:
  receiving one or more first messages in said routing server from said first mobile station through said wireless network, said first messages including said second personal identification number;
  sending said one or more first messages from said routing server to said second mobile station through said wireless network, said one or more first messages being routed to said second mobile station based on said second personal identification number;
  receiving one or more second messages in said routing server from said second mobile station through said wireless network, said second messages including said first personal identification number;
  sending said one or more second messages from said routing server to said first mobile station through said wireless network, said one or more second messages being routed to said first mobile station based on said first personal identification number; and
  periodically receiving a plurality of availability information messages in said routing server from said first mobile station through said wireless network and sending each one of said availability information messages from said routing server to a corresponding one of said contact mobile stations through said wireless network.

10. The method according to claim 9, wherein each of said contact mobile stations has a corresponding contact personal identification number, wherein each of said availability information messages includes one of said contact personal identification numbers, and wherein each of said availability information messages is routed by said routing server based on the contact personal identification number included therewith.

11. A method of exchanging messages between a first mobile station and a second mobile station in a system including a wireless network and a routing server coupled to said wireless network, said first mobile station having one or more first communications applications, said first mobile station having a first personal identification number and said second mobile station having a second personal identification number, the method comprising:

sending an invitation message from said first mobile station to said second mobile station using one of said one or more first communications applications, said invitation message including said first personal identification number, and sending a second invitation message from said first mobile station to said second mobile station using another one of said one or more first communications applications, said second invitation message including said first personal identification number;

receiving in said first mobile station an acceptance message from said second mobile station, said acceptance message including said second personal identification number;

creating in said first mobile station one or more first messages, said first messages including said second personal identification number;

sending said one or more first messages to said routing server through said wireless network, said one or more first messages being routed by said routing server to said second mobile station through said wireless network based on said second personal identification number; and receiving in said first mobile station one or more second messages from said second mobile station through said wireless network and said routing server, said one or more second messages including said first personal identification number and said one or more second messages being routed by said routing server to said first mobile station based on said first personal identification number.

12. The method according to claim 11, said first mobile station having a contact database having a plurality of contacts each having a corresponding contact mobile station, the method further comprising said first mobile station periodically sending availability information messages to said contact mobile stations.

13. The method according to claim 12, further comprising said first mobile station receiving second availability information messages from one or more of said contact mobile stations, and displaying availability information on said first mobile station based on said second availability information messages.

14. The method according to claim 13, said second availability information messages being derived from a current operational state of said one or more of said contact mobile stations.

15. The method according to claim 14, said second availability information messages relating to a specific state of or an event occurring on said one or more of said contact mobile stations.

16. The method according to claim 12, said plurality of corresponding contact mobile stations having a plurality of corresponding contact personal identification numbers, each of said availability information messages including one of said contact personal identification numbers, said sending said availability information messages to said contact mobile stations comprising sending said availability information messages to said routing server through said wireless network and sending said availability information messages from said routing server to said contact mobile stations through said wireless network, said routing server routing said availability information messages based on said contact personal identification numbers.

17. The method according to claim 11, said one or more first communications applications being selected from the group consisting of a wireless telephone application, an email application, a short message service (SMS) application, a multimedia messaging service (MMS) application, and an enhanced message service (EMS) application.

18. A method of exchanging messages between a first mobile station and a second mobile station in a system including a wireless network and a routing server coupled to said wireless network, said first mobile station having one or more first communications applications, said first mobile station having a first personal identification number and said second mobile station having a second personal identification number, the method comprising:

sending an invitation message from said first mobile station to said second mobile station using one of said one or more first communications applications, said invitation message including said first personal identification number;

receiving in said first mobile station an acceptance message from said second mobile station, said acceptance message including said second personal identification number;

creating in said first mobile station one or more first messages, said first messages including said second personal identification number;

sending said one or more first messages to said routing server through said wireless network, said one or more first messages being routed by said routing server to said second mobile station through said wireless network based on said second personal identification number;

receiving in said first mobile station one or more second messages from said second mobile station through said wireless network and said routing server, said one or more second messages including said first personal identification number and said one or more second messages being routed by said routing server to said first mobile station based on said first personal identification number; and periodically sending an availability information message to said routing server through said wireless network, said availability information message being routed by said routing server to said second mobile station through said wireless network based on said second personal identification number.

19. The method according to claim 18, wherein said availability information message is derived from a current operational state of said first mobile station.

20. A method of exchanging messages between a first mobile station and a second mobile station in a system including a wireless network and a routing server coupled to said wireless network, said first mobile station having one or more first communications applications, said first mobile station having a first personal identification number and said second mobile station having a second personal identification number, said first mobile station having a contact database having a plurality of contacts each having a corresponding contact mobile station, the method comprising:

sending an invitation message from said first mobile station to said second mobile station using one of said one or more first communications applications, said invitation message including said first personal identification number;

receiving in said first mobile station an acceptance message from said second mobile station, said acceptance message including said second personal identification number;

creating one or more first messages, said first messages including said second personal identification number;

sending said one or more first messages to said routing server through said wireless network, said one or more first messages being routed by said routing server to said second mobile station through said wireless network based on said second personal identification number;

receiving in said first mobile station one or more second messages from said second mobile station through said wireless network and said routing server, said one or more second messages including said first personal identification number and said one or more second messages being routed by said routing server to said first mobile station based on said first personal identification number; and periodically sending a plurality of availability information messages from said first mobile station to said routing server through said wireless network, wherein each of said contact mobile stations has a corresponding contact personal identification number, wherein each of said availability information messages includes one of said contact personal identification numbers, and wherein each of said availability information messages is routed by said routing server to a corresponding one of said contact mobile stations through said wireless network based on the contact personal identification number included therewith.

21. The method according to claim 20, wherein each of said availability information messages is derived from a current operational state of said first mobile station.

22. A system comprising a first mobile station, a second mobile station, and a routing server coupled to a wireless network, said system being configured for exchanging messages between first mobile device and said second mobile via said routing server and said wireless network, said first mobile station having one or more first communications applications and said second mobile station having one or more second communications applications, said first mobile station having a first personal identification number and said second mobile station having a second personal identification number, the system being operable for:

sending an invitation message from said first mobile station to said second mobile station using one of said one or more first communications applications, said invitation message including said first personal identification number;

sending an acceptance message from said second mobile station to said first mobile station using one of said one or more second communications applications, said acceptance message including said second personal identification number;

creating one or more first messages, said first messages including said second personal identification number;

sending said one or more first messages to said routing server through said wireless network;

sending said one or more first messages from said routing server to said second mobile station through said wireless network, said one or more first messages being routed by said routing server based on said second personal identification number;

creating one or more second messages, said second messages including said first personal identification number;

sending said one or more second messages to said routing server through said wireless network;

sending said one or more second messages from said routing server to said first mobile station through said wireless network, said one or more second messages being routed by said routing server based on said first personal identification number; and said first mobile station periodically sending an availability information message to said second mobile station.

23. The system according to claim 22, said availability information message including said second personal identification number.

24. The system according to claim 23, said sending said availability information message to said second mobile station comprising sending said availability information message to said routing server through said wireless network and sending said availability information message from said routing server to said second mobile station through said wireless network, said routing server routing said availability information message based on said second personal identification number.

25. The system according to claim 22, said availability information message being derived from a current operational state of said first mobile station.

26. The system according to claim 25, said availability information message relating to a specific state of or an event occurring on said first mobile station.

27. The system according to claim 22, said one of said first communications applications and said one of said second communications applications being of the same type.

28. A routing server configured for facilitating the exchange of messages between a first mobile station and a second mobile station in a system including a wireless network, said routing server being coupled to said wireless network, said first mobile station having one or more first communications applications and said second mobile station having one or more second communications applications, said first mobile station having a first personal identification number and said second mobile station having a second personal identification number, wherein said first mobile station sends an invitation message to said second mobile station using one of said one or more first communications applications, said invitation message including said first personal identification number, and wherein said second mobile station sends an acceptance message to said first mobile station using one of said one or more second communications applications, said acceptance message including said second personal identification number, the routing server being operable for:

receiving one or more first messages from said first mobile station through said wireless network, said one or more first messages including said second personal identification number;

sending said one or more first messages to said second mobile station through said wireless network, said one or more first messages being routed to said second mobile station based on said second personal identification number;

receiving one or more second messages from said second mobile station through said wireless network, said one or more second messages including said first personal identification number;

sending said one or more second messages to said first mobile station through said wireless network, said one or more second messages being routed to said first mobile station based on said first personal identification number; and periodically receiving an availability information message from said first mobile station through said wireless network and sending said availability information message to said second mobile station through said wireless network, said availability information message being routed to said second mobile station based on said second personal identification number.

29. The routing server according to claim 28, said availability information message including said second personal identification number.

30. A routing server configured for facilitating the exchange of messages between a first mobile station and a second mobile station in a system including a wireless network, said routing server being coupled to said wireless network, said first mobile station having one or more first communications applications and said second mobile station having one or more second communications applications, said first mobile station having a first personal identification number and said second mobile station having a second personal identification number, wherein said first mobile station sends an invitation message to said second mobile station using one of said one or more first communications applications, said invitation message including said first personal identification number, and wherein said second mobile station sends an acceptance message to said first mobile station using one of said one or more second communications applications, said acceptance message including said second personal identification number, said first mobile station having a contact database having a plurality of contacts each having a corresponding contact mobile station, the routing server being operable for:
    receiving one or more first messages from said first mobile station through said wireless network, said first messages including said second personal identification number;
    sending said one or more first messages to said second mobile station through said wireless network, said one or more first messages being routed to said second mobile station based on said second personal identification number;
    receiving one or more second messages from said second mobile station through said wireless network, said second messages including said first personal identification number;
    sending said one or more second messages to said first mobile station through said wireless network, said one or more second messages being routed to said first mobile station based on said first personal identification number; and
    periodically receiving a plurality of availability information messages from said first mobile station through said wireless network and sending each one of said availability information messages from said routing server to a corresponding one of said contact mobile stations through said wireless network.

31. The routing server according to claim 30, wherein each of said contact mobile stations has a corresponding contact personal identification number, wherein each of said availability information messages includes one of said contact personal identification numbers, and wherein each of said availability information messages is routed by said routing server based on the contact personal identification number included therewith.

32. A first mobile station configured for exchanging messages with a second mobile station in a system including a wireless network and a routing server coupled to said wireless network, said first mobile station having one or more first communications applications, said first mobile station having a first personal identification number and said second mobile station having a second personal identification number, the first mobile station being operable for:
    sending an invitation message to said second mobile station using one of said one or more first communications applications, said invitation message including said first personal identification number, and sending a second invitation message from said first mobile station to said second mobile station using another one of said one or more first communications applications, said second invitation message including said first personal identification number;
    receiving an acceptance message from said second mobile station, said acceptance message including said second personal identification number;
    creating one or more first messages, said first messages including said second personal identification number;
    sending said one or more first messages to said routing server through said wireless network, said one or more first messages being routed by said routing server to said second mobile station through said wireless network based on said second personal identification number; and
    receiving one or more second messages from said second mobile station through said wireless network and said routing server, said one or more second messages including said first personal identification number and said one or more second messages being routed by said routing server to said first mobile station based on said first personal identification number.

33. The first mobile station according to claim 32, further comprising a contact database having a plurality of contacts each having a corresponding contact mobile station, the first mobile station being further operable for periodically sending availability information messages to said contact mobile stations.

34. The first mobile station according to claim 33, further operable for receiving second availability information messages from one or more of said contact mobile stations, and displaying availability information on said first mobile station based on said second availability information messages.

35. The first mobile station according to claim 34, said second availability information messages being derived from a current operational state of said one or more of said contact mobile stations.

36. The first mobile station according to claim 35, said second availability information messages relating to a specific state of or an event occurring on said one or more of said contact mobile stations.

37. The first mobile station according to claim 33, said plurality of corresponding contact mobile stations having a plurality of corresponding contact personal identification numbers, each of said availability information messages including one of said contact personal identification numbers, said sending said availability information messages to said contact mobile stations comprising sending said availability information messages to said routing server through said wireless network and sending said availability information messages from said routing server to said contact mobile stations through said wireless network, said routing server routing said availability information messages based on said contact personal identification numbers.

38. The first mobile station according to claim 32, said one or more first communications applications being selected from the group consisting of a wireless telephone application, an email application, a short message service (SMS) application, a multimedia messaging service (MMS) application, and an enhanced message service (EMS) application.

39. A first mobile station configured for exchanging messages with a second mobile station in a system including a wireless network and a routing server coupled to said wireless network, said first mobile station having one or more first communications applications, said first mobile station having a first personal identification number and said second mobile station having a second personal identification number, the first mobile station being operable for:

sending an invitation message to said second mobile station using one of said one or more first communications applications, said invitation message including said first personal identification number;

receiving an acceptance message from said second mobile station, said acceptance message including said second personal identification number;

creating one or more first messages, said first messages including said second personal identification number;

sending said one or more first messages to said routing server through said wireless network, said one or more first messages being routed by said routing server to said second mobile station through said wireless network based on said second personal identification number;

receiving one or more second messages from said second mobile station through said wireless network and said routing server, said one or more second messages including said first personal identification number and said one or more second messages being routed by said routing server to said first mobile station based on said first personal identification number; and     periodically sending an availability information message to said routing server through said wireless network, said availability information message being routed by said routing server to said second mobile station through said wireless network based on said second personal identification number.

40. The mobile station according to claim 39, wherein said availability information message is derived from a current operational state of said first mobile station.

41. A first mobile station configured for exchanging messages with a second mobile station in a system including a wireless network and a routing server coupled to said wireless network, said first mobile station having one or more first communications applications, said first mobile station having a first personal identification number and said second mobile station having a second personal identification number, said first mobile station having a contact database having a plurality of contacts each having a corresponding contact mobile station, the first mobile station being operable for:

sending an invitation message to said second mobile station using one of said one or more first communications applications, said invitation message including said first personal identification number;

receiving an acceptance message from said second mobile station, said acceptance message including said second personal identification number;

creating one or more first messages, said first messages including said second personal identification number;

sending said one or more first messages to said routing server through said wireless network, said one or more first messages being routed by said routing server to said second mobile station through said wireless network based on said second personal identification number;

receiving one or more second messages from said second mobile station through said wireless network and said routing server, said one or more second messages including said first personal identification number and said one or more second messages being routed by said routing server to said first mobile station based on said first personal identification number; and     periodically sending a plurality of availability information messages to said routing server through said wireless network, wherein each of said contact mobile stations has a corresponding contact personal identification number, wherein each of said availability information messages includes one of said contact personal identification numbers, and wherein each of said availability information messages is routed by said routing server to a corresponding one of said contact mobile stations through said wireless network based on the contact personal identification number included therewith.

42. The mobile station according to claim 41, wherein each of said availability information messages is derived from a current operational state of said first mobile station.

\* \* \* \* \*